United States Patent
Dinur et al.

(10) Patent No.: US 9,473,220 B2
(45) Date of Patent: Oct. 18, 2016

(54) DEVICE, SYSTEM AND METHOD OF CONTROLLING WIRELESS COMMUNICATION BASED ON AN ORIENTATION-RELATED ATTRIBUTE OF A WIRELESS COMMUNICATION DEVICE

(75) Inventors: Nati Dinur, Haifa (IL); Yaron Alpert, Hod Hasharon (IL); Menashe Sofer, Herzeliya (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,057

(22) PCT Filed: Aug. 22, 2011

(86) PCT No.: PCT/US2011/048658
§ 371 (c)(1),
(2), (4) Date: Jun. 26, 2013

(87) PCT Pub. No.: WO2013/028171
PCT Pub. Date: Feb. 28, 2013

(65) Prior Publication Data
US 2014/0140426 A1      May 22, 2014

(51) Int. Cl.
H04B 7/04       (2006.01)
H04B 7/06       (2006.01)
H04M 1/725      (2006.01)

(52) U.S. Cl.
CPC .......... H04B 7/0404 (2013.01); H04B 7/0689 (2013.01); H04M 1/7253 (2013.01); H04M 1/72569 (2013.01)

(58) Field of Classification Search
CPC ............. H04B 7/0689; H04B 7/0404; H04M 1/72569; H04W 16/28
See application file for complete search history.

(56) References Cited

U.S. PATENT DOCUMENTS

| 5,300,935 | A  | 4/1994  | Yu              |
| 5,649,306 | A  | 7/1997  | Vannatta et al. |
| 6,281,839 | B1 | 8/2001  | Nielsen         |
| 6,311,075 | B1 | 10/2001 | Bevan et al.    |
| 8,230,075 | B1 | 7/2012  | Weskamp et al.  |

(Continued)

FOREIGN PATENT DOCUMENTS

| EP | 1360857    | 5/2011  |
| JP | 2004356739 | 12/2004 |

(Continued)

OTHER PUBLICATIONS

Wireless Gigabit Alliance (WGA) Specifications; WiGig MAC and PHY Specification Version 1.0, Apr. 2010—Final Specification; 311 pages.
IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications.

(Continued)

*Primary Examiner* — Curtis Odom
(74) *Attorney, Agent, or Firm* — Shichrur & Co.

(57) ABSTRACT

Some demonstrative embodiments include devices, systems and/or methods of controlling wireless communication based on an orientation-related attribute of a wireless communication device. For example, a wireless communication device may include a controller to receive from a sensor orientation-related information indicating an orientation-related attribute of the wireless communication device, and to control an antenna scheme of one or more antennas of the wireless communication device based on said orientation-related information.

20 Claims, 4 Drawing Sheets

(56) References Cited

U.S. PATENT DOCUMENTS

| | | |
|---|---|---|
| 2002/0106995 A1 | 8/2002 | Callaway, Jr. |
| 2003/0232598 A1 | 12/2003 | Aljadeff et al. |
| 2005/0192056 A1 | 9/2005 | Karaki |
| 2006/0007041 A1 | 1/2006 | Oomuro |
| 2006/0240866 A1 | 10/2006 | Eilts |
| 2006/0287085 A1 | 12/2006 | Mao et al. |
| 2007/0188380 A1 | 8/2007 | Duong et al. |
| 2007/0263578 A1 | 11/2007 | Nakaso et al. |
| 2008/0024363 A1 | 1/2008 | Van Toorenburg |
| 2008/0311957 A1* | 12/2008 | Jantunen ............... H04W 8/005 455/560 |
| 2009/0156235 A1* | 6/2009 | Johansson et al. ........ 455/456.6 |
| 2009/0295648 A1* | 12/2009 | Dorsey et al. ................ 343/702 |
| 2009/0303204 A1 | 12/2009 | Nasiri et al. |
| 2010/0333043 A1 | 12/2010 | Faris et al. |
| 2012/0058783 A1 | 3/2012 | Kim et al. |
| 2012/0071151 A1 | 3/2012 | Abramson et al. |
| 2012/0105720 A1 | 5/2012 | Chung et al. |
| 2012/0122400 A1 | 5/2012 | Kitagawa et al. |
| 2012/0256959 A1 | 10/2012 | Ye et al. |
| 2012/0265528 A1 | 10/2012 | Gruber et al. |
| 2013/0065648 A1 | 3/2013 | Kim et al. |
| 2013/0069969 A1 | 3/2013 | Chang et al. |
| 2013/0084981 A1 | 4/2013 | Zalewski et al. |
| 2013/0151195 A1 | 6/2013 | Marinoni |
| 2013/0238455 A1 | 9/2013 | Laracey |
| 2014/0118254 A1 | 5/2014 | Fei et al. |
| 2014/0125575 A1 | 5/2014 | Singhar |
| 2014/0148193 A1 | 5/2014 | Kogan et al. |
| 2014/0159957 A1 | 6/2014 | Kasher et al. |

FOREIGN PATENT DOCUMENTS

| | | |
|---|---|---|
| JP | 2006295622 | 10/2006 |
| JP | 2007274518 | 10/2007 |
| KR | 20030058098 | 7/2003 |
| KR | 20090074814 | 7/2009 |

OTHER PUBLICATIONS

International Search Report and Written Opinion for PCT/US2011/048658, mailed on Feb. 21, 2012, 9 pages.
International Search Report and Written Opinion for PCT Patent Application No. PCT/US2013/047733, mailed on Sep. 30, 2013, 12 pages.
International Search Report and Written Opinion for PCT Patent Application No. PCT/US2013/048087, mailed on Sep. 26, 2013, 13 pages.
International Preliminary Report on Patentability for PCT Application No. PCT/US2011/048658, mailed on Mar. 6, 2014, 6 pages.
Office Action for U.S. Appl. No. 13/688,425, mailed on Feb. 9, 2015, 33 pages.
European Search Report for European Patent Application No. 11871311.4, mailed on Apr. 8, 2015, 6 pages.
Notice of Allowance for U.S. Appl. No. 13/688,425, mailed on Jun. 8, 2015, 10 pages.
International Preliminary Report on Patentability and Written Opinion for International Patent Application No. PCT/US2013/047733, mailed on Jun. 11, 2015, 8 pages.
Extended European Search Report for European Patent Application No. 11871311.4, mailed on Jul. 27, 2015, 10 pages.
Final Office Action for U.S. Appl. No. 13/707,106, mailed on Jan. 6, 2016, 14 pages.
Advisory Action for U.S. Appl. No. 13/707,106, mailed on Apr. 1, 2016, 9 pages.
Office Action of U.S. Appl. No. 13/707,106, mailed Sep. 9, 2015, 50 pages.
Office Action for U.S. Appl. No. 13/707,106, mailed on May 2, 2016, 13 pages.
Office Action for U.S. Appl. No. 13/707,106, mailed on Aug. 18, 2016, 21 pages.

* cited by examiner

US 9,473,220 B2

DEVICE, SYSTEM AND METHOD OF CONTROLLING WIRELESS COMMUNICATION BASED ON AN ORIENTATION-RELATED ATTRIBUTE OF A WIRELESS COMMUNICATION DEVICE

CROSS REFERENCE

This application is a National Phase Application of PCT International Application No. PCT/US2011/048658, International Filing Date Aug. 22, 2011, the entire disclosure of which is incorporated herein by reference.

BACKGROUND

Some wireless communication schemes may implement multi-antenna communication schemes, e.g., beamforming schemes, Multi-Input Multi-Output (MIMO) schemes, Multi-Input Single-Output (MISO) schemes, Single-Input Multi-Output (SIMO) schemes and the like, for directional signal transmission and/or reception, for spatial signal transmission and/or reception, and/or for selectively using one or more antennas for communication.

A wireless communication device utilizing a multi-antenna scheme may be required to perform link-maintenance operations to maintain and/or adjust a communication link using the multi-antenna scheme. The link-maintenance operations may consume link resources, e.g., bandwidth, and/or may cause interruption to communications over the communication link.

For example, in a beamforming scheme, a first wireless communication device and a second wireless communication device may establish a wireless communication beamformed link ("beamformed link"). A beamformed transmission may be transmitted over the beamformed link by controlling the phase and/or relative amplitude of a signal transmitted by each of a plurality of antennas.

The first and/or second wireless communication devices may include, for example, a millimeter wave (mmWave) station (STA) ("mSTA") having a radio transmitter operating on a channel that is within a directional band ("DBand"). The DBand may include any suitable frequency band, e.g., having a channel starting frequency above 50 GHz, in which a STA is allowed to operate.

The first wireless communication device ("the initiator") may initiate the establishment of the beamformed link and, in response, the second wireless communication device ("the responder") may perform a link-establishment procedure for establishing the beamformed link.

The first and/or second wireless communication devices may be required to perform various link-maintenance operations to maintain and/or adjust the beamformed link. The link maintenance operations may include, for example, transmit/receive antenna selection operations and/or beam steering operations. The link-maintenance operations may consume link resources, e.g., bandwidth, and/or may cause interruption to communications over the beamformed links.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
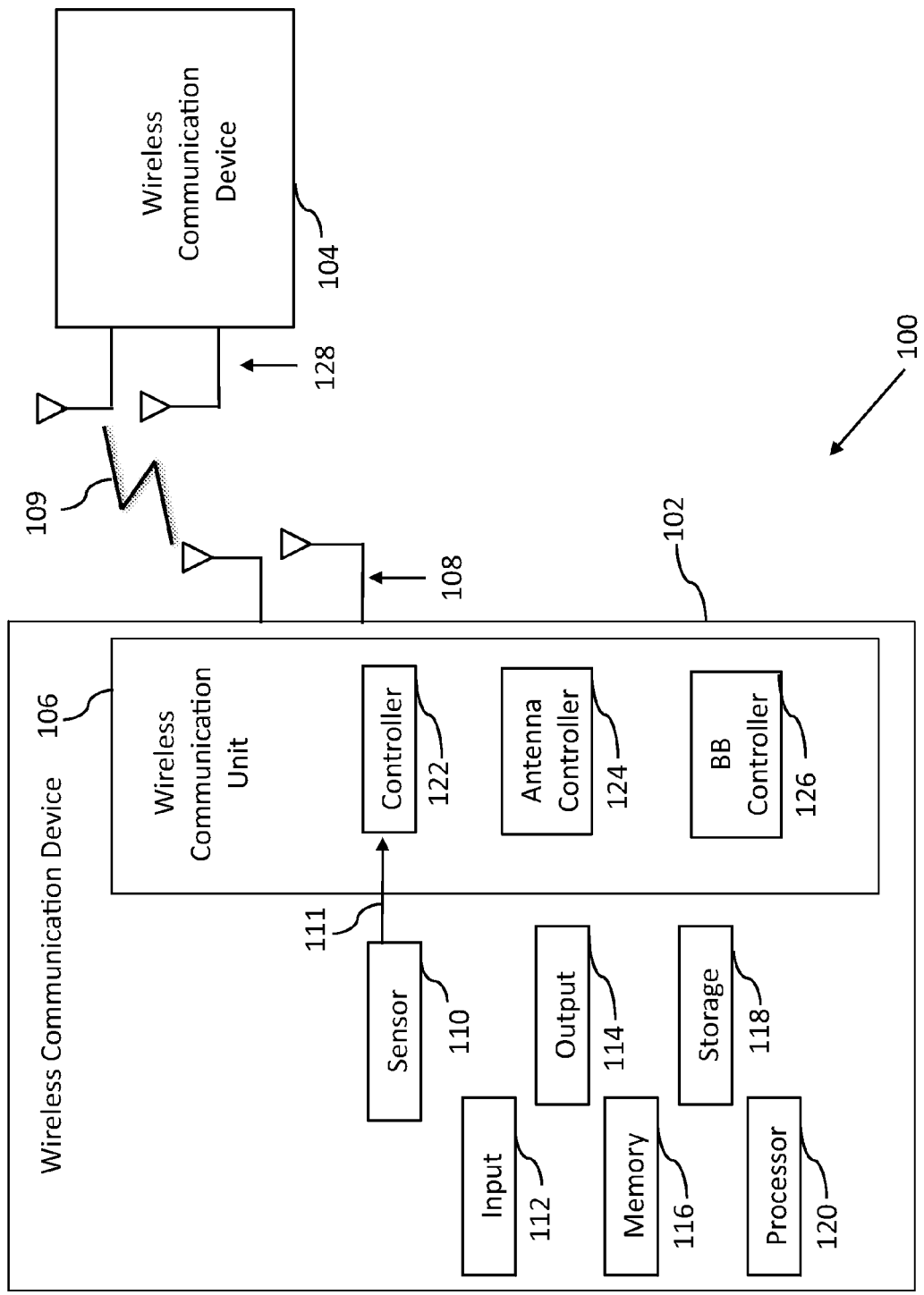
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (*Wireless Gigabit Alliance, Inc WiGig MAC and PHY Specification Version 1.0, April 2010, Final specification*) and/or future versions and/or derivatives thereof, devices and/or networks operating in accordance with existing IEEE 802.11 standards (*IEEE 802.11-2007, IEEE Standard for Information Technology—Telecommunications and information exchange* between systems—Local and metropolitan area networks—Specific requirements, Part 11: Wireless LAN Medium Access Control (MAC) and Physical Layer (PHY) Specifications; IEEE 802.11n-2009, IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput; IEEE 802.11 task group ad (TGad)) and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless-WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz, e.g., in accordance with the WGA specifications, the IEEE802.11 specifications and/or any other specification. However, other embodiments may be implemented utilizing any other suitable wireless communication frequency bands over any other frequency band, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include an antenna covered by a quasi-omni antenna pattern. For example, the antenna may include at least one of a phased array antenna, a single element antenna, a set of switched beam antennas, and the like.

The phrase "quasi-omni antenna pattern", as used herein, may include an operating mode with a widest practical beamwidth attainable for a particular antenna. In one example, the antenna gain of the main beam with the quasi-omni pattern may be, e.g., at most 15 dB, lower than the antenna gain in the main beam for a directional pattern.

Reference is now made to FIG. 1, which schematically illustrates a block diagram of a system 100 in accordance with some demonstrative embodiments.

As shown in FIG. 1, in some demonstrative embodiments, system 100 may include a wireless communication network including one or more wireless communication devices, e.g., wireless communication devices 102 and/or 104, capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 104 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication device 102 may include at least one wireless communication module 106 to perform wireless communication with wireless communication device 104 and/or with one or more other wireless communication devices, e.g., as described below. In one example, wireless communication device 102 may include at least one wireless communication module 106 to perform wireless communication. In another example, wireless communication device 102 may include a plurality of wireless communication modules 106, e.g., capable of performing wireless communication in accordance with one or more wireless communication schemes or protocols, e.g., WiFI, WiGig, Bluetooth, and the like.

Wireless communication devices 102 and/or 104 may also include, for example, one or more of a processor 120, an input unit 112, an output unit 114, a memory unit 116, and a storage unit 118. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of wireless communication device 102 and/or of one or more suitable applications.

Input unit 112 includes, for example, a keyboard, a keypad, a mouse, a touch-pad, a track-ball, a stylus, a microphone, or other suitable pointing device or input device. Output unit 114 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 116 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 118 includes, for example, a hard disk drive, a floppy disk drive, a Compact Disk (CD) drive, a CD-ROM drive, a DVD drive, or other suitable removable or non-removable storage units. Memory unit 116 and/or storage unit 118, for example, may store data processed by wireless communication device 102.

In some demonstrative embodiments, wireless communication module 106 may include, or may be associated with, one or more antennas 108. Wireless communication device 104 may include, or may be associated with, one or more antennas 128. Antennas 108 and/or 128 may include any type of antennas suitable for transmitting and/or receiving wireless communication signals, blocks, frames, transmission streams, packets, messages and/or data. For example, antennas 108 and/or 128 may include any suitable configuration, structure and/or arrangement of one or more antenna elements, components, units, assemblies and/or arrays. Antennas 108 and/or 128 may include an antenna covered by a quasi-omni antenna pattern. For example, antennas 108 and/or 128 may include at least one of a phased array antenna, a single element antenna, a set of switched beam antennas, and the like. In some embodiments, antennas 108 and/or 128 may implement transmit and receive functionalities using separate transmit and receive antenna elements. In some embodiments, antennas 108 and/or 128 may implement transmit and receive functionalities using common and/or integrated transmit/receive elements.

In some demonstrative embodiments, wireless communication module 106 include, for example, one or more wireless transmitters, receivers and/or transceivers able to send and/or receive wireless communication signals, RF signals, frames, blocks, transmission streams, packets, messages, data items, and/or data. For example, wireless communication module 106 may include or may be implemented as part of a wireless Network Interface Card (NIC), and the like.

In some demonstrative embodiments, wireless communication devices 102 and 104 may establish a suitable wireless communication link utilizing a multi-antenna scheme, e.g., a beamforming scheme, a Multi-Input Multi-Output (MIMO) scheme, a Multi-Input Single-Output (MISO) scheme, a Single-Input Multi-Output (SIMO) scheme, and the like, for directional signal transmission and/or reception, for spatial signal transmission and/or reception, and/or for selectively using one or more antennas for communication. Some demonstrative embodiments are described below with reference to a beamforming scheme, however other embodiments may be implemented with respect to any other suitable antenna scheme.

In some demonstrative embodiments, wireless communication devices 102 and 104 may establish a wireless communication beamformed link 109 ("beamformed link" or "beamformed communication link"). For example, wireless communication devices 102 and 104 may establish beamformed link 109 according to a link-establishment method and/or procedure, e.g., in accordance with the WGA specifications, the IEEE802.11 specifications and/or any other specification, t method and/or procedure.

In some demonstrative embodiments, a first wireless communication device ("the initiator") of wireless communication devices 102 and 104, e.g., wireless communication module 106, may initiate the establishment of beamformed link 109, for example, while a second wireless communication device ("the responder") of wireless communication devices 102 and 104, e.g., wireless communication device 104, may respond to the initiation by performing link-establishment operations.

In some demonstrative embodiments, beamformed link 109 may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, one or more beamforming parameters corresponding beamformed link 109 may be dependent on a relative location and/or directionality between devices 102 and 104. The beamforming parameters may be determined and/or set, for example, as part of the link-establishment of beamformed link 109. The beamforming parameters may include, for example, the phase and/or relative amplitude to be used for transmitting a beamformed transmission over link 109 and/or one or more beamforming weights to be applied for receiving the beamformed transmission, In some demonstrative embodiments, wireless communication device 106 may include a controller 122 to control wireless communication performed by wireless communication device 102 based on at least one orientation-related attribute of wireless communication device 102, e.g., as described in detail below.

The phrase "orientation-related attribute" as used herein with reference to a device may include any suitable attribute and/or parameter defining and/or representing a physical manipulation, movement, rotation orientation and/or displacement of the device. For example, the orientation-related attribute of wireless communication device 102 may include any suitable attribute and/or parameter defining and/or representing an orientation, a movement, a rotation, a displacement and/or a physical manipulation of wireless communication device 102.

In some demonstrative embodiments, controller 122 may be implemented, or included, as part of wireless communication module 106. For example, controller 122 may be implemented, or included, as part of any suitable antenna controller 124 and/or base-band (BB) controller 126 of wireless communication module 106. In other embodiments, controller 122 and wireless communication module 106 may be implemented as separate elements of wireless communication device 102.

In some demonstrative embodiments, wireless communication device 102 may include at least one sensor 110 capable of sensing the orientation-related attribute of wireless communication device 102. Sensor 110 may include any suitable device, unit, module and/or element capable of sensing, detecting, tracking and/or determining at least one orientation-related attribute and/or a change of the at least one orientation-related attribute of wireless communication device 102. For example, sensor 110 may include any suitable movement detector or sensor, orientation detector or sensor, accelerometer, compass, e.g., digital compass, camera, tracking module, tracing module, and the like.

In some demonstrative embodiments, controller 122 may receive orientation-related information 111 indicative of the orientation-related attribute of wireless communication device 102. Information 111 may be generated for example sensor 110. Sensor 110 may generate information 111 in any suitable format.

In some demonstrative embodiments, sensor 110 may be implemented, or included, as part of wireless communication module 106 and/or as part of controller 122. In other embodiments, sensor 110 and wireless communication module 106 and/or controller 122 may be implemented as separate elements of wireless communication device 102. Although in some embodiments, e.g., as shown in FIG. 1, sensor 110 may be implemented as part of device 102, in other embodiments, sensor 110 may include a sensor external to device 102. For example, sensor 110 may be implemented as part of another device of system 100. According to this example, information 111 may include remote sensor information, which may be received by wireless communication device 102 in any suitable manner, e.g., via any suitable wireless transmission.

In some demonstrative embodiments, controller 122 may control at least one of wireless communication module 106 and/or antennas 108 based on information 111, e.g., as described in detail below.

In some demonstrative embodiments, controller 122 may control and/or adjust at least one multi-antenna scheme utilized by at least one wireless communication device 106 based on information 111. Some demonstrative embodiments are described below with reference to adjusting and/or controlling a beamforming link, however other embodiments may be implemented to adjust and/or control a link of any other suitable antenna scheme.

In some demonstrative embodiments, controller 122 may maintain and/or adjust beamformed link 109, based on information 111, for example, without involving wireless communication device 104, e.g., as described in detail below.

The maintaining and/or adjusting of beamformed link 109 based on information 111 may reduce and/or eliminate the use of link-maintenance operations which involve wireless communication device 104, reducing and/or eliminating the use of link-maintenance operations which interrupt communication between wireless communication devices 102 and 104 over link 109, and/or reducing and/or eliminating the use of link-maintenance operations which occupy link 109, e.g., for exchanging information related to the maintenance and/or adjustment of link 109. Accordingly, consumption of link resources of link 109, e.g., bandwidth, may be reduced and/or an interruption to communications over beamformed link 109 may be reduced, e.g., compared to the link consumption and/or interruption resulting from conventional link-maintenance operations.

In some demonstrative embodiments, controller 122 may control an antenna scheme of one or more of antennas 108 based on information 111. For example, controller 122 may adjust the antenna scheme of antennas 108 based on a change in the orientation-related attribute of wireless communication device 102, e.g., as described below.

In some demonstrative embodiments, controller 122 may receive from sensor 110 information 111 including first orientation information indicating a first orientation-related attribute of wireless communication device 102 and second orientation information indicating a second orientation-related attribute of wireless communication device 102, e.g., subsequent to the first orientation-related attribute. For example, controller 122 may receive information 111 from sensor 110 according to a predefined timing scheme, e.g., every second, or the like. In another example, sensor 110 may be capable of providing information 111 to controller 122 based on any suitable criterion, for example, when a change in a sensed orientation-related attribute is detected, when the change in the sensed orientation-related attribute is equal to or greater than a predefined threshold, and the like. In another example, information 111 may include relative orientation information indicating a relative orientation-related attribute of device 102, e.g., with respect to a start point, a reference point or value, and the like.

In some demonstrative embodiments, controller 122 may adjust the antenna scheme of wireless communication device 102 based on the change of the orientation-related attribute of device 102. For example, controller 122 may adjust the communication scheme to compensate for the change in the orientation-related attribute of device 102, e.g., as described in detail below.

In some demonstrative embodiments, controller may adjust the antenna scheme of wireless communication device 102 by adjusting one or more beamforming parameters corresponding beamformed link 109, e.g., by adjusting the phase and/or relative amplitude to be used for transmitting form device 102 a beamformed transmission over link 109 and/or one or more beamforming weights to be applied for receiving a beamformed transmission at device 102.

In some demonstrative embodiments, the orientation-related attribute may include, for example, an orientation angle of wireless communication device 102. For example, sensor 110 may include an orientation sensor, and information 111 may relate to the orientation angle of device 102. According to these embodiments, controller 122 may adjust the antenna scheme of antennas 108 based on a change in the orientation of device 102, for example, to compensate for the change in the orientation of device 102, e.g., as described below.

In some demonstrative embodiments, controller 112 may adjust, based on information 111, a multiple-antenna weighted receiving and/or transmission scheme, e.g., as described below.

In one embodiment, controller 122 may adjust, based on information 111, a beamforming scheme of antennas 108, which is used for communication over beamformed link 109.

For example, device 102 may be at a first orientation with respect to device 104, e.g., when link 109 is established. Accordingly, antennas 108 may be configured, e.g., by antenna controller 124, to form a communication beam, for example, a mmwave communication beam, which is based on the first orientation, for communicating with device 104 over link 109 based on the first orientation.

According to this embodiment, controller 122 may cause antenna controller 124 to adjust the communication beam of antennas 108 based on the orientation of wireless communication device 102, e.g., based on a change in the orientation of wireless communication device with respect to wireless communication device 104. For example, if the orientation of device 102 changes to a second, different, orientation, controller 122 may cause antenna controller 124 to perform a beam steering procedure to steer the communication beam based on a change between the first and second orientations. For example, controller 122 may cause antenna controller 124 to perform a beam steering procedure to steer the communication beam in a direction substantially opposite to a direction of the change between the first and second orientation, e.g., by switching one or more of antennas 108 elements and/or by changing relative phases of RF signals transmitted by antennas 108. In one example, wireless communication device 102 may direct antennas 108 to form a communication beam when wireless communication device 102 is directed at a first orientation angle with respect to wireless communication device 104. Wireless communication device 102 may be moved to a second orientation angle with respect to wireless communication device 104, e.g., the second orientation angle is increased by five degrees relative to the first orientation angle. According to this example, controller 124 may perform a beam steering procedure, e.g., by switching one or more of antennas 108 elements and/or by changing relative phases of RF signals transmitted by antennas 108, to steer the communication beam back by five degrees, e.g., such that the communication beam remains directed to device 104.

In some demonstrative embodiments, controller 122 may be configured to adjust and/or calibrate sensor 110 and/or to adjust information 111 based on feedback from at least one wireless communication device 106. For example, wireless communication device 106 may be configured to generate a fine-tuning feedback, e.g., in response to the adjustment of the beamforming scheme, the fine tuning feedback indicating a beamforming deviation resulting from the adjustment of the beamforming scheme. Controller 122 may be configured to calibrate sensor 110 and/or to adjust information 111 calibrate and/or adjust based on the fine tuning feedback.

In another example, controller 122 may control the antenna scheme of antennas 108 by switching between one or more of antennas 108, e.g., according to any suitable antenna selection procedure. For example, antennas 108 may include two or more antennas and/or antenna schemes covering two or more, e.g., different, areas. For example, device 102 may be at the first orientation with respect to device 104, for example, when link 109 is established. Accordingly, a first antenna scheme including one or more of antennas 108 may be selected, e.g., by antenna controller 124, to form a communication beam, which is directed towards device 104 based on the first orientation, for communicating with device 104 over link 109.

According to this embodiment, controller 122 may cause antenna controller 124 to switch between one or more of antennas 108 based on the orientation of wireless communication device 102. For example, if the orientation angle of device 102 changes from the first orientation to a second, different, orientation, controller 122 may cause antenna controller 124 to switch to a second antenna scheme including one or more other antennas of antennas 108 based on a change between the first and second orientation angles. For example, when wireless communication device is moved the second orientation the first antenna scheme may not be directed anymore to wireless communication device 104. Controller 122 may cause antenna controller 124 to switch to a second, different antenna scheme including one or more of antennas 108 directed to the direction of device 104, when device 102 is at the second orientation angle.

In one example, wireless communication device 102 may include a first set of one or more antennas 108 located on a first side of wireless communication device, and a second set of one or more antennas 108 located on a second side of wireless communication device, e.g., opposite to the first side. Link 109 may be established, for example, when wireless communication device 102 is at a first orientation, e.g., when the first side of wireless communication device 102 is directed to wireless communication device 104. Accordingly, the first set of antennas 108 may be selected for communication over link 109. Upon movement of wireless communication device 102 to a second orientation, e.g., when the second side of wireless communication device 102 is directed to wireless communication device 104, controller 122 may control antenna controller 124 to select the second set of antennas for communication over link 109.

In some demonstrative embodiments, wireless communication device 102 may maintain at least one backup antenna scheme for communication over link 109. Wireless communication module 106 may determine the backup antenna scheme, for example, as part of the link establishment procedure of link 109. For example, during the link establishment procedure, wireless communication unit 106 may define a particular beamforming antenna scheme ("the current beamforming scheme") of antennas 108 to be used for forming the communication beam for communicating with wireless communication device 104 over link 109, and at least one backup beamforming antenna scheme to be used for communicating over link 109, e.g., upon detecting interruption to the current beamforming antenna scheme.

In some demonstrative embodiments, the current beamforming antenna scheme and the backup beamforming antenna scheme may be configured to be directed to substantially the same direction, e.g., the direction of wireless communication device 104 during the link establishment procedure. Accordingly, it may be beneficial to switch between the current beamforming antenna scheme and the backup beamforming antenna scheme when detecting interruption communication over link 109 while an orientation of wireless communication device 102 remains substantially unchanged. However, if the interruption communication over link 109 occurs while the orientation of wireless communication device 102 is changed, then switching to the backup beamforming antenna scheme may not be effective.

In some demonstrative embodiments, controller 122 may cause wireless communication device 102 to switch from the current antenna scheme to the backup antenna scheme based on communication link quality over link 109 and based on information 111.

In some demonstrative embodiments, controller 122 may cause wireless communication device 102 to switch from the current antenna scheme to the backup antenna scheme, if a predefined reduction in the link quality is detected, while the change in the orientation-related attribute of device 102, e.g., as indicated by information 111, is equal to or lesser than a predefined threshold, which may indicate that the orientation of wireless communication device 102 remains substantially unchanged.

In some demonstrative embodiments, controller 122 may cause wireless communication device 102 to perform other link maintenance operations, e.g., to reestablish link 109, for example, without switching from the current antenna scheme to the backup antenna scheme, if, for example, the predefined reduction in the link quality is detected, while the change in the orientation-related attribute of device 102, e.g., as indicated by information 111, indicates that the orientation of wireless communication device 102 has substantially changed.

In some demonstrative embodiments, controller 122 may control one or more other operations of wireless communication device 102 based on information 111, e.g., as described in detail below.

In some demonstrative embodiments, controller 122 may control one or more power-save operations of wireless communication device 102 based on information 111. For example, controller 122 may cause wireless communication module to switch to a non-power-save mode of operation, e.g., to an active mode of operation, upon detecting a change, e.g., greater than a predefined threshold, in the orientation-related attribute of device 102, which may indicate substantial movement of device 102.

In some demonstrative embodiments, controller 122 may control, based on information 111, one or more connectivity switching operations of a connectivity switching procedure performed by wireless communication unit 106 for switching communication to another wireless communication device, e.g., as described below.

In some demonstrative embodiments, controller 122 may control, based on information 111, one or more scanning and/or detection operations of a scanning and/or detection procedure performed by wireless communication unit 106 for searching and/or detecting another wireless communication device, e.g., as described below.

In some demonstrative embodiments, controller 122 may control wireless communication unit 106 to switch between one or more scanning and/or detection procedures based on information 111. For example, a first scanning and/or detection procedure may be suitable for a first orientation-related attribute of device 102, while a second scanning and/or detection procedure may be suitable for a second orientation-related attribute of device 102.

In some demonstrative embodiments, controller 122 may control one or more roaming operations of a roaming procedure performed by wireless communication unit 106 for searching another wireless communication device.

Although some embodiments are described below with respect to controlling one or more connectivity switching operations, other embodiments may be implemented to control any suitable scanning and/or detection operations and/or procedures based on information 111.

In one embodiment, wireless communication device 104 may include an Access Point (AP) or any other wireless communication controller or coordinator e.g., in accordance with the WGA standard, the IEEE 80.211 standards, and the like. Wireless communication unit 106 may perform one or more connectivity switching operations for searching, detecting and/or connecting to another wireless communication device, for example, based on any suitable connectivity switching criterion. The connectivity switching operations may include operations of any suitable connectivity switching procedure, e.g., as defined by the WGA standard, the IEEE 802.11 standards, and the like. The connectivity switching criterion may include, for example, any criterion indicating that there may be a need to switch connectivity to another wireless communication device, e.g., upon detecting a quality reduction in link 109, and the like. The connectivity-switching criterion may be defined to determine whether or not another wireless communication device is to be searched, e.g., since wireless communication device 102 has moved out of a coverage area of wireless communication device 104. However, in some cases there may be no need to search for another device, e.g., although the connectivity-switching criterion is met. For example, in some cases there may be no need to search for another device, since the connectivity switching criterion may be met due to reasons not requiring the search of another wireless communication device, e.g., wireless communication device 102 may still be within the coverage area of wireless communication device 104, although the quality of link 109 is reduced. For example, the quality reduction of link 109 may result from a change in the orientation-related attribute of wireless communication device 102.

In some demonstrative embodiments, controller 122 may select, based on information 111, whether or not to perform the connectivity switching operations for searching and/or connecting to another wireless communication device. For example, controller 122 may cause wireless communication unit 106 to perform the connectivity switching operations, when the connectivity switching criterion is met, e.g., only if the orientation of wireless communication device 102, as indicated by information 111, remains substantially unchanged. For example, controller 122 may cause wireless communication unit 106 to perform the connectivity switching operations only if a change in the orientation-related attribute of device 102 is equal to or greater than a predefined threshold. Controller 122 may cause wireless communication unit 106 not to perform the connectivity switching operations, for example, even if the connectivity switching criterion is met, while the orientation of wireless communication device 102, as indicated by information 111, has substantially changed, e.g., if the change in the orientation-related attribute of device 102 is lesser than the predefined threshold. According to these embodiments, causing wireless communication unit 106 to perform the connectivity switching operations based on information 111 may reduce power consumption by wireless device 102, for example, the power required for performing the switching operation, e.g., a scanning operation.

Figure 2:
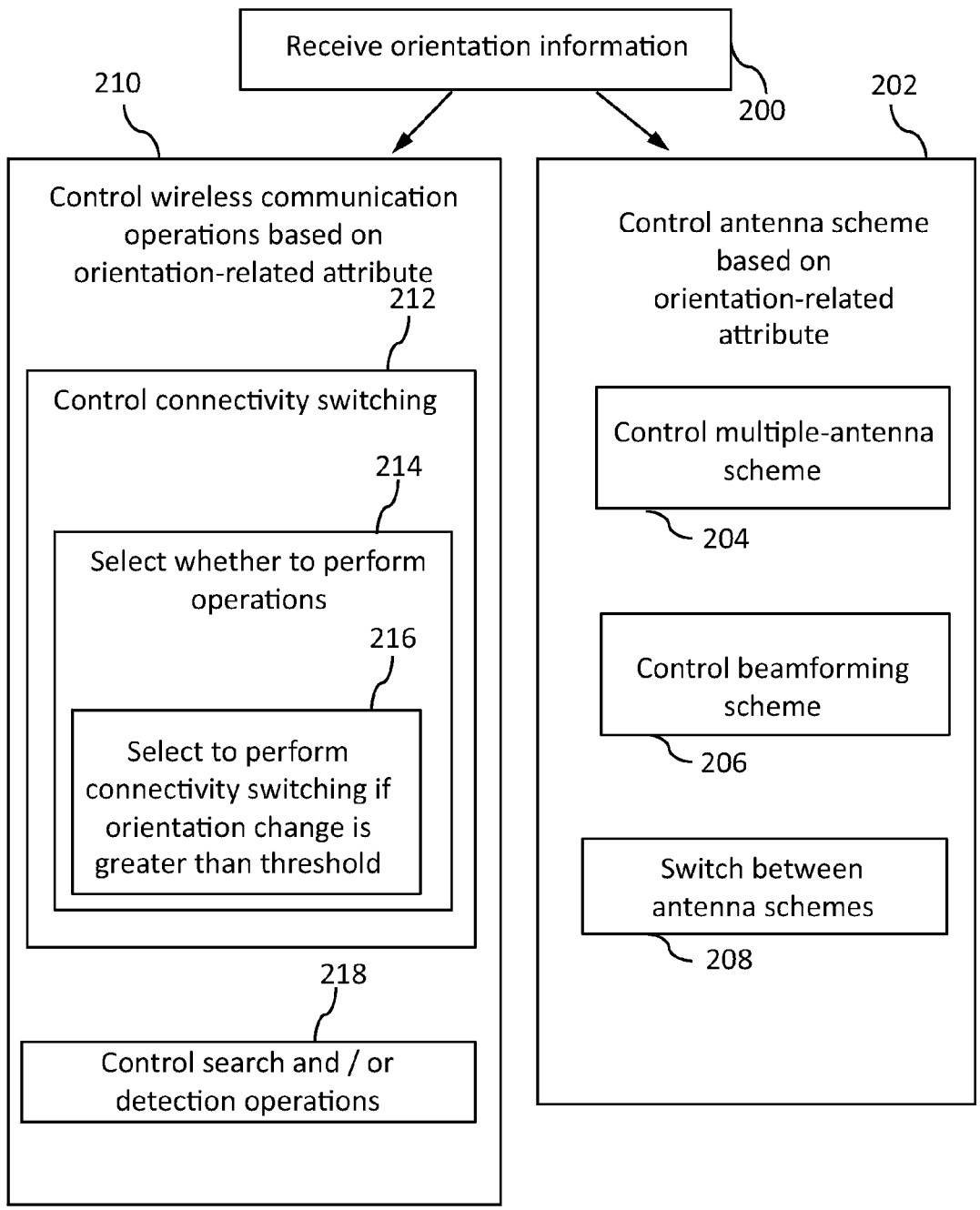
FIG. 2 is a schematic illustration of a method of controlling wireless communication based on an orientation-related attribute of a wireless communication device, in accordance with some demonstrative embodiments.

Reference is made to FIG. 2, which schematically illustrates a method of controlling wireless communication based on an orientation-related attribute of a wireless communication device, in accordance with some demonstrative embodiments. In some embodiments, one or more of the operations of the method of FIG. 2 may be performed by any suitable wireless communication system e.g., system 100 (FIG. 1); wireless communication device, e.g., devices 102 and/or 104 (FIG. 1); and/or wireless communication module, e.g., wireless communication unit 106 (FIG. 1).

As indicted at block 200, the method may include receiving at a wireless communication device orientation-related information indicative of an orientation-related attribute of the wireless communication device. For example, controller 122 (FIG. 1) may receive information 111 (FIG. 1) from at least one sensor 110 (FIG. 1), e.g., as described above. The information may include relative orientation information, remote orientation information and/or any other suitable information, e.g., as described above.

As indicated at block 202, the method may include controlling an antenna scheme of the wireless communication device based on the orientation information. For example, controller 122 (FIG. 1) may control an antenna scheme of one or more of antennas 108 (FIG. 1) based on information 111 (FIG. 1), e.g., as described above.

As indicated at block 204, controlling the antenna scheme may include controlling a multiple-antenna weighted receiving and/or transmission scheme based on the orientation information. For example, controller 122 (FIG. 1) may control a multiple-antenna weighted receiving and/or transmission scheme of one or more of antennas 108 (FIG. 1) based on information 111 (FIG. 1), e.g., as described above.

As indicated at block 206, controlling the antenna scheme may include controlling a beamforming scheme based on the orientation information. For example, controller 122 (FIG. 1) may control a beamforming scheme of one or more of antennas 108 (FIG. 1) based on information 111 (FIG. 1), e.g., as described above.

As indicated at block 208, controlling the antenna scheme may include switching between one or more sets of one or more antenna schemes based on the orientation information. For example, controller 122 (FIG. 1) may switch between one or more sets of one or more antenna schemes of one or more of antennas 108 (FIG. 1) based on information 111 (FIG. 1), e.g., as described above.

As indicated at block 210, the method may include controlling one or more wireless-communication related operations of the wireless communication device based on the orientation information.

As indicated at block 212, the method may include controlling one or more connectivity switching operations based on the orientation information. For example, controller 122 (FIG. 1) may control one or more connectivity switching operations of wireless communication unit 106 (FIG. 1) based on information 111 (FIG. 1), e.g., as described above.

As indicated at block 214, controlling the one or more connectivity switching operations may include selecting, based on the orientation information, whether or not to perform one or more connectivity switching operations at the wireless communication device.

As indicated at block 216, the selecting may include selecting to perform the connectivity switching operations only if a change in the orientation-related attribute is equal to or greater than a predefined threshold. For example, controller 122 (FIG. 1) may cause wireless communication unit 106 (FIG. 1) to perform one or more connectivity switching operations, e.g., one or more roaming operations, only if a change of the orientation-related attribute of device 102 (FIG. 1), as indicated by information 111 (FIG. 1), is equal to or greater than a predefined threshold, e.g., as described above.

As indicated at block 218, the method may include controlling one or more search and/or detection operations based on the orientation information.

Figure 3:
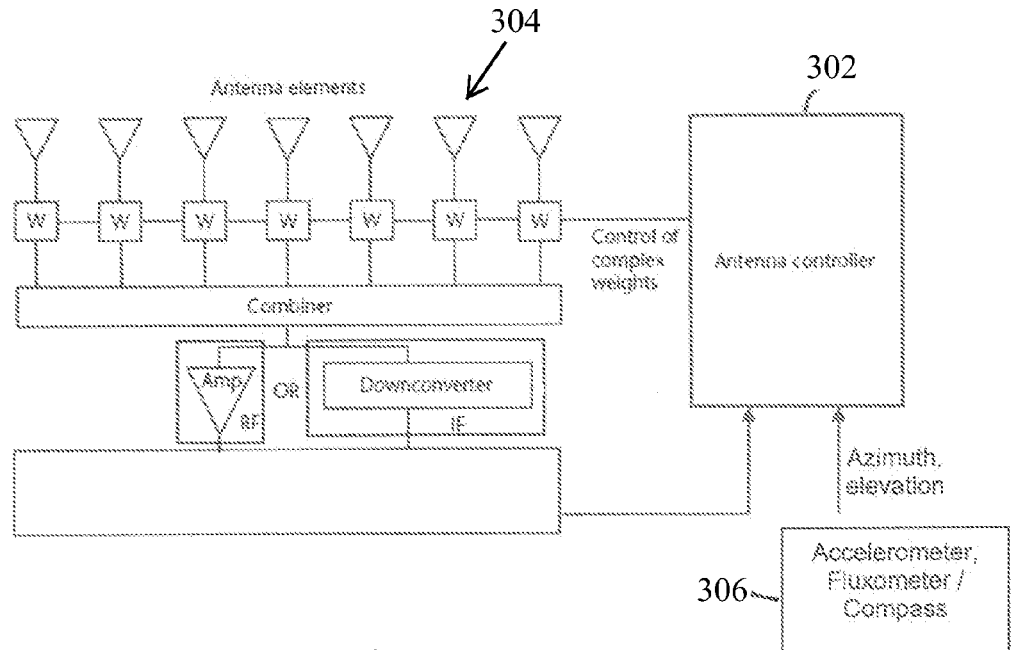
FIG. 3 is a schematic illustration of a first antenna-controller scheme, in accordance with some demonstrative embodiments.

Reference is made to FIG. 3, which schematically illustrates a first antenna-controller scheme, in accordance with some demonstrative embodiments. As shown in FIG. 3, the functionality of controller 122 (FIG. 1) may be implemented, or included, as part of an antenna controller 302 capable of controlling complex weights assigned to a plurality of antennas 304, based on orientation-related information, e.g., azimuth, elevation, and the like, received from a sensor 306.

Figure 4:
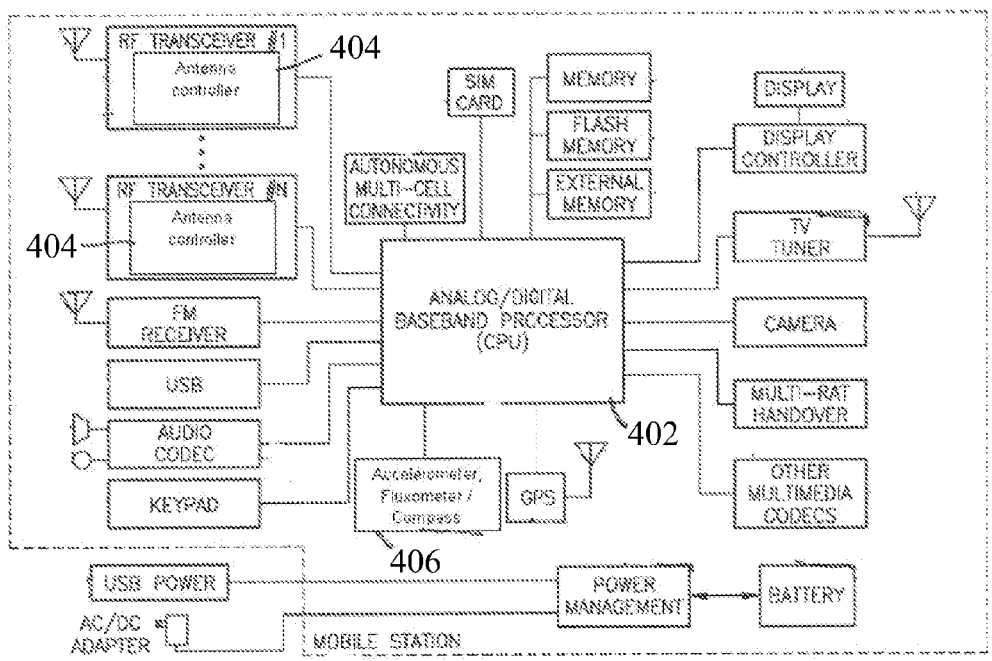
FIG. 4 is a schematic illustration of a second antenna-controller scheme, in accordance with some demonstrative embodiments.

Reference is made to FIG. 4, which schematically illustrates a second antenna-controller scheme, in accordance with some demonstrative embodiments. As shown in FIG. 4, the functionality of controller 122 (FIG. 1) may be implemented, or included, as part of a BB controller 402 capable of controlling one or more antenna controllers 404, based on orientation information received from a sensor 406 and/or one or more other elements.

Figure 5:
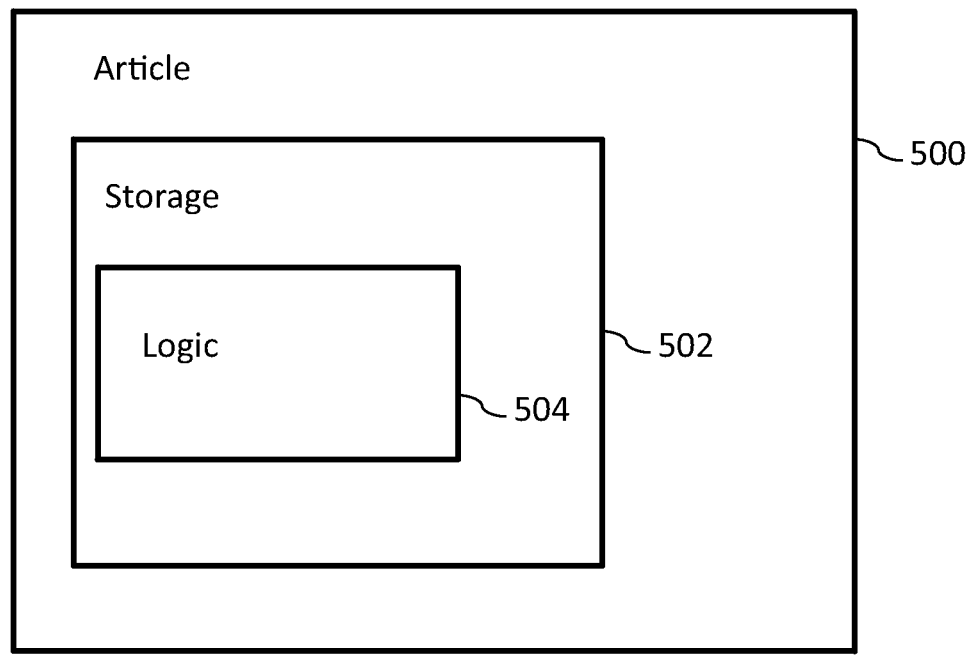
FIG. 5 is a schematic illustration of an article of manufacture, in accordance with some demonstrative embodiments.

Reference is made to FIG. 5, which schematically illustrates an article of manufacture 500, in accordance with some demonstrative embodiments. Article 500 may include a machine-readable storage medium 502 to store logic 504, which may be used, for example, to perform at least part of the functionality of controller 122 (FIG. 1), wireless communication unit 106 (FIG. 1), wireless communication device 102 (FIG. 1), and/or to perform one or more operations of the method of FIG. 2.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device comprising:
   a controller to receive from a sensor orientation-related information indicating an orientation-related attribute of said wireless communication device during communication with a first wireless communication device, and to control an antenna scheme of one or more antennas of said wireless communication device based on said orientation-related information,
   wherein said controller is to select, based on a comparison between a change in the orientation-related attribute and a threshold, whether or not to perform one or more wireless communication operations selected from a group consisting of a connectivity-switching operation to switch connectivity from the first wireless communication device to a second wireless communication device, and a scanning operation to detect other wireless communication devices.

2. The wireless communication device of claim 1, wherein said controller is to adjust said antenna scheme based on the change in said orientation-related attribute during communication over a communication link.

3. The wireless communication device of claim 2 wherein, if the change in said orientation-related attribute is equal to or lesser than a predefined threshold, said controller is to switch from a current antenna scheme to a backup antenna scheme based on communication link quality.

4. The wireless communication device of claim 2, wherein said controller is to adjust a weighted antenna scheme of said antennas according to the change in the orientation-related attribute of said wireless communication device.

5. The wireless communication device of claim 4, wherein said controller is to adjust said weighted scheme by adjusting a directionality of said antenna scheme opposite to a directionality of said change.

6. The wireless communication device of claim 1, wherein said controller is to control said antenna scheme during communication over a communication link, and wherein said controller is to control said antenna scheme by causing said wireless communication device to switch between at least first and second antennas, based on said orientation-related information.

7. The wireless communication device of claim 1, wherein said controller is to select, based on said orientation-related information, whether or not to perform the scanning operation.

8. The wireless communication device of claim 1, wherein said orientation-related information comprises information indicative of at least one attribute selected from a group consisting of an orientation of said wireless communication device, a movement of said wireless communication device, and a rotation of said wireless communication device.

9. The wireless communication device of claim 1 comprising said sensor.

10. The wireless communication device of claim 1, wherein said sensor is external to said wireless communication device.

11. The wireless communication device of claim 1, wherein said controller comprises at least one controller selected from a group consisting of an antenna controller and a base-band controller.

12. A wireless communication device comprising:
    one or more antennas;
    a memory;
    a processor; and
    a controller to receive orientation-related information indicating an orientation-related attribute of said wireless communication device during communication with a first wireless communication device, and to control an antenna scheme of the one or more antennas based on said orientation-related information, said controller is to select, based on a comparison between a change in the orientation-related attribute and a threshold, whether or not to perform one or more wireless communication operations selected from a group consisting of a connectivity-switching operation to switch connectivity from the first wireless communication device to a second wireless communication device, and a scanning operation to detect one or more other wireless communication devices.

13. The wireless communication device of claim 12, wherein said controller is to adjust said antenna scheme based on the change in said orientation-related attribute during communication with the first other wireless communication device over a communication link.

14. The wireless communication device of claim 12, wherein said orientation-related information comprises information indicative of at least one attribute selected from a group consisting of an orientation of said wireless communication device, a movement of said wireless communication device, and a rotation of said wireless communication device.

15. A product including a non-transitory storage medium having stored thereon instructions that, when executed by a machine, result in:

controlling an antenna scheme of one or more antennas of a wireless communication device based on orientation-related information indicating an orientation-related attribute of said wireless communication device during communication with a first wireless communication device; and selecting, based on a comparison between a change in the orientation-related attribute and a threshold, whether or not to perform one or more wireless communication operations selected from a group consisting of a connectivity-switching operation to switch connectivity from the first wireless communication device to a second wireless communication device, and a scanning operation to detect one or more other wireless communication devices.

16. The product of claim 15, wherein the instructions result in adjusting said antenna scheme based on the change in said orientation-related attribute during communication with the first wireless communication device over a communication link.

17. The product of claim 16, wherein the instructions result in, if the change in said orientation-related attribute is equal to or lesser than a predefined threshold, switching from a current antenna scheme to a backup antenna scheme based on communication link quality.

18. The product of claim 16, wherein the instructions result in adjusting a weighted antenna scheme of said antennas according to the change in the orientation-related attribute of said wireless communication device.

19. The product of claim 15, wherein said orientation-related information comprises information indicative of at least one attribute selected from a group consisting of an orientation of said wireless communication device, a movement of said wireless communication device, and a rotation of said wireless communication device.

20. The product of claim 15, wherein the instructions result in controlling said antenna scheme, during communication with the first wireless communication device over a communication link, by causing said wireless communication device to switch between at least first and second antennas, based on said orientation-related information.

* * * * *